US006385264B1

(12) United States Patent
Terasawa et al.

(10) Patent No.: US 6,385,264 B1
(45) Date of Patent: May 7, 2002

(54) METHOD AND APPARATUS FOR MITIGATING INTERFERENCE BETWEEN BASE STATIONS IN A WIDEBAND CDMA SYSTEM

(75) Inventors: Daisuke Terasawa, San Diego; Avneesh Agrawal, Sunnyvale, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/328,119

(22) Filed: Jun. 8, 1999

(51) Int. Cl.[7] .............................. H04L 7/00; H04B 7/216
(52) U.S. Cl. ..................... 375/371; 375/130; 370/342
(58) Field of Search .................... 375/371, 146, 375/296, 295, 220, 149, 130, 367, 141; 370/342, 335, 321

(56) References Cited

U.S. PATENT DOCUMENTS

4,901,307 A  2/1990  Gilhousen et al. .......... 370/320
5,103,459 A  4/1992  Giihousen et al. .......... 375/130

*Primary Examiner*—Chi Pham
*Assistant Examiner*—Khai Tran
(74) *Attorney, Agent, or Firm*—Philip Wadsworth; Kent D. Baker; S. Hossain Beladi (57) ABSTRACT

A method for mitigating the effect of interference between a first base station and a second base station, the first base station and second base stations both sharing a same primary synchronization code. The method includes generating a primary synchronization channel having the primary synchronization code. In a W-CDMA system, all base stations share this primary synchronization code, causing code timing collisions. The present invention includes rotating the primary synchronization channel in phase according to a phase rotation sequence before transmitting the primary synchronization channel. By rotating the primary synchronization channel in phase according to the phase rotation sequence, the interference can be reduced. The phase rotation sequence may be pseudorandom in phase. The phase rotation sequence may include changing phase once per slot, or alternately once per frame. The phase rotation sequence may also be based at least in part on a secondary synchronization code.

20 Claims, 5 Drawing Sheets

--PRIOR ART--

METHOD AND APPARATUS FOR MITIGATING INTERFERENCE BETWEEN BASE STATIONS IN A WIDEBAND CDMA SYSTEM

BACKGROUND OF THE INVENTION

I. Field of the Invention

The present invention relates to wireless telecommunications systems. More particularly, the present invention relates to a novel and improved method and apparatus for mitigating the effects of destructive interference between the respective synchronization channels broadcast by two or more base stations in a code-division multiple access system.

II. Description of the Related Art

In a wireless radiotelephone communication system, many users communicate over a wireless channel. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

Recently, third-generation (3G) CDMA communication systems have been proposed including proposals such as cdma2000 and W-CDMA. These 3G CDMA communication systems are conceptually similar to each other with some significant differences. One significant difference is that in the cdma2000 system, each of the base stations operates synchronously. In other words, each base station in the cdma2000 system operates according to the same universal time reference. Each base station transmits a pilot channel having the same PN spreading code, but having a different PN phase offset. As a result, a mobile station can acquire the pilot channel of one or more base stations by searching through the possible PN phase offsets of the known PN spreading code. Additionally, the mobile station can distinguish among different base stations by their respective PN phase offsets, even though they are using the same PN spreading code.

However, under the currently proposed W-CDMA system standard, each of the base stations operates asynchronously. In other words, there is no universal time reference among separate base stations. In the W-CDMA system, each base station transmits a "synchronization" channel that comprises two sub-channels. The first of the two sub-channels, the primary synchronization channel, uses a primary synchronization code, $c_p$, that is common to all base stations. The second of the two sub-channels, the secondary synchronization channel, uses a cyclic set of secondary synchronization codes, $c_s$, that are not shared by other base stations that are not in the same code group. The mobile station in a W-CDMA system can acquire the synchronization channel of one or more base stations by searching for the primary synchronization code, $c_p$ of the primary synchronization channel, and then using the timing information derived from the primary synchronization channel to process the secondary synchronization channel.

Figure 1:
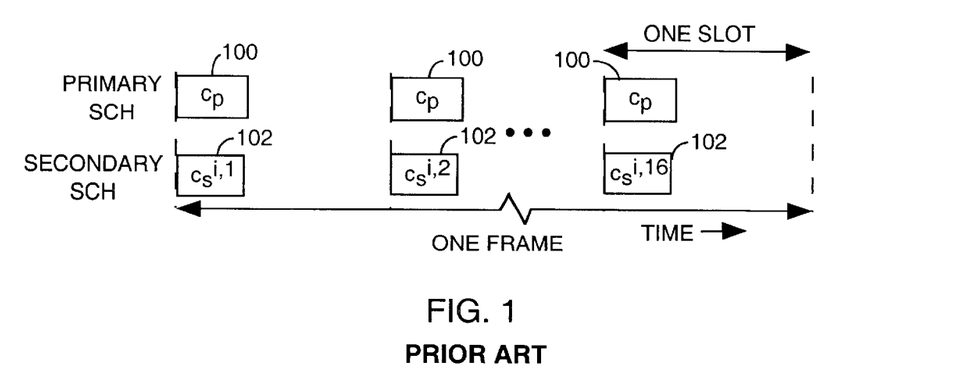
FIG. 1 is a timing diagram illustrating the structure of the synchronization channel (SCH) of a W-CDMA system.

FIG. 1 is a timing diagram illustrating the structure of the synchronization channel (SCH) of a W-CDMA system. In FIG. 1, one frame is illustrated. The one frame comprises sixteen individual slots, separated in FIG. 1 by dashed lines. The primary synchronization channel is shown as a burst 100 of the primary synchronization code, transmitted at the beginning of each slot. The secondary synchronization channel is shown as a burst 102 of one of 17 possible secondary synchronization codes, transmitted in parallel with the primary synchronization code at the beginning of each slot.

The primary synchronization channel comprises an unmodulated code that is the same for every base station in the system, and is transmitted time-aligned with the slot boundary of the transmitting base station. The secondary synchronization channel comprises a sequence of 16 unmodulated code words that are orthogonal to each other and to the primary synchronization code. Each secondary synchronization code word is chosen from a set of 17 different orthogonal codes. The sequence on the secondary SCH indicates which of the 32 different code groups the base station PN scrambling code belongs to. 32 sequences are used to encode the 32 different code groups each containing 16 scrambling codes. The 32 sequences are constructed such that their cyclic shifts are unique. In other words, a non-zero cyclic shift less than 16 of any of the 32 sequences is not equivalent to some cyclic shift of any other of the 32 sequences. This property is used to uniquely determine both the long code group of the base station and the frame timing. It should be noted that the term "scrambling" code as used with reference to a W-CDMA system is synonymous with the term "spreading" code as used above with reference to a cdma2000 system. However, for consistency and clarity of disclosure with respect to W-CDMA based systems, the terminology "scrambling" code will be used herein to denote the code used to spread the information signal over the desired bandwidth.

During cell search, the mobile station searches for the base station to which it has the lowest path loss. It then determines the downlink scrambling code and frame synchronization of that base station. The cell search begins by using the synchronization channel. During the first step of the cell search procedure, the mobile station uses the primary SCH to acquire slot synchronization to the strongest base station. This may be done with a single matched filter matched to the primary synchronization code, $c_p$, which is common to all base stations. During the second step of the cell search, the mobile station uses the secondary SCH to find frame synchronization and identify the code group of the base station found in the first step. This is done by correlating the received signal with all possible (16) secondary synchronization codes. Specifically, the mobile station correlates the sequence of 16 code words that are received against the 32 possible sequence patterns and 16 possible cyclic shifts, for a total of 32×16 possibilities. During the third and last step of the initial cell search, the mobile station determines the exact PN scrambling code used by the found base station. The scrambling code is identified through symbol-by-symbol correlation of the pilot symbols received over one or more common channels with the PN scrambling codes that belong to the code group identified by the second step.

Figure 2:
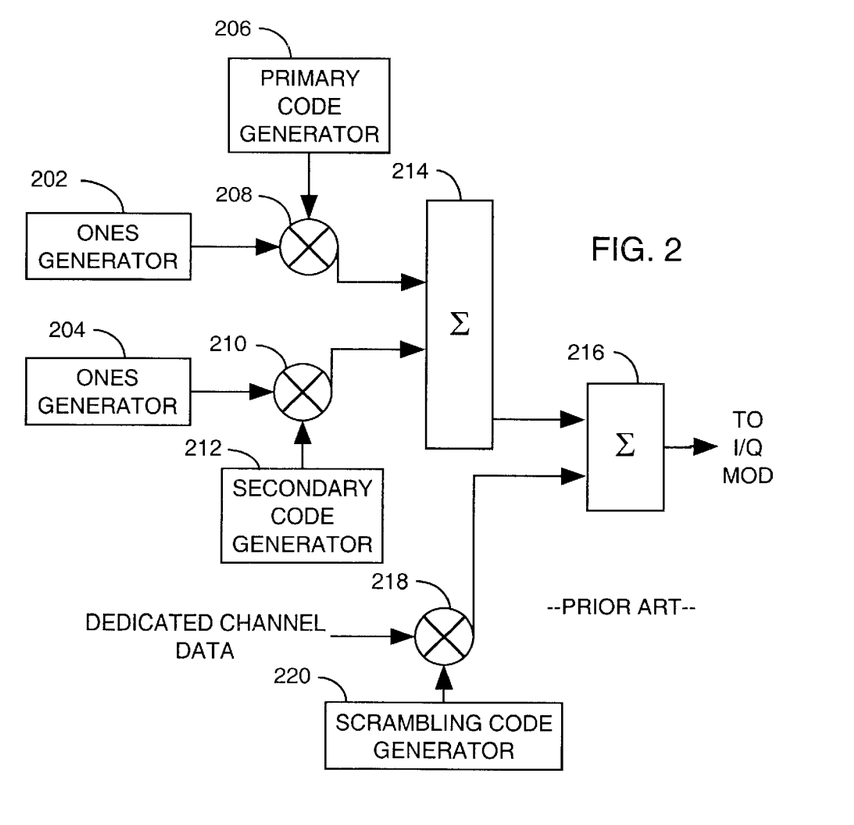
FIG. 2 is a functional block diagram of the multiplexing of the synchronization channel (SCH) with the other downlink physical channels (dedicated channels)

A functional block diagram of the multiplexing of the synchronization channel (SCH) with the other downlink physical channels (dedicated channels) is shown in FIG. 2.

In FIG. 2, ones generator 202 generates a sequence of logical one values for 256 bits at the beginning of each slot. To be more precise, ones generator 202 generates the complex signal 1+j1. These ones are complex spread in complex spreader 208 with the primary synchronization code, $c_p$, from primary code generator 206. The primary synchronization code is common to all base stations. Together the ones generator 202, primary code generator 206 and complex spreader 208 may be referred to as a "primary synchronization channel generator".

Ones generator 204 (which may be the same as ones generator 202) also generates a sequence of logical one values for 256 chips at the beginning of each slot. The ones are complex spread in complex spreader 210 with the secondary synchronization code, $c_s$, from secondary code generator 212. Together, the ones generator 204, complex spreader 210, and secondary code generator 212 may be referred to as a "secondary synchronization channel generator". The in-phase (I) and quadrature-phase (Q) components of the primary SCH and the secondary SCH are then respectively combined in combiner 214 to form the synchronization channel (SCH). Dedicated channel data is complex spread in complex spreader 218 with a scrambling code, $c_{scramb}$, which is also unique to the particular base station. The scrambled dedicated channel data is combined with the SCH in combiner 216 and forwarded to an I/Q modulator (not shown) for modulation.

As can be seen from FIGS. 1 and 2, the presently proposed SCH of the W-CDMA system is transmitted with a zero phase offset. Since the base stations in a W-CDMA system operate asynchronously, there will be regions within the coverage area of multiple base stations where the primary SCH from multiple base stations will arrive at the mobile station with the same time alignment. When this happens, detection of the primary SCH timing could become difficult for the mobile station. In the worst case, the primary SCH's from different base stations would arrive at the mobile station so that they destructively interfere with one another, preventing the mobile station from acquiring primary SCH. Furthermore, if the propagation environment is changing slowly, such a state of destructive interference could persist for a considerable length of time. This is of particular concern when the mobile station is stationery, such as in a wireless local loop (WLL) system, or when the mobile station is otherwise moving relatively slowly.

What is needed is a method and apparatus for mitigating this prolonged state of destructive interference caused by code timing collisions.

SUMMARY OF THE INVENTION

The present invention is a novel and improved method for mitigating the effect of interference between a first base station and a second base station, the first base station and second base stations both sharing a same primary synchronization code. The method includes generating a primary synchronization channel having the primary synchronization code. In a W-CDMA system, all base stations share this primary synchronization code. It is this sharing of a common primary synchronization code that causes code timing collisions. To mitigate the effects of these collisions, the method of the present invention includes rotating the primary synchronization channel in phase according to a phase rotation sequence before transmitting the primary synchronization channel. By rotating the primary synchronization channel in phase according to the phase rotation sequence, instances of prolonged destructive interference may be reduced.

In the preferred embodiment the phase rotation sequence is pseudorandom in phase, but for simplicity, includes changing phase by integer multiples of $\pi/2$ radians. However, it may include pseudorandomly changing phase by any arbitrary angle. With regard to timing, the phase rotation sequence may include changing phase once per slot, or alternately once per frame. However, it may include changing the phase at any arbitrary periodicity so long as it is changed at a slot boundary (i.e., not during the middle of a slot).

In the exemplary W-CDMA system, method also includes generating a secondary synchronization channel having a secondary synchronization code, with the phase rotation sequence being based at least in part on the secondary synchronization code. Basing the phase rotation sequence at least in part on the secondary synchronization code allows for convenience since the secondary synchronization code is already present for other purposes. Additionally, in areas where base stations in different code groups are adjacent to each other, basing the phase rotation sequence at least in part on the secondary synchronization code (which is not shared among base stations in different code groups) will minimize the duration of interference.

In various embodiments, the method includes combining the primary synchronization channel and the secondary synchronization channel to produce a synchronization channel. In a first embodiment, the step of rotating the primary synchronization channel in phase comprises rotating the primary synchronization channel before the combining step. Thus, the first embodiment rotates only the primary synchronization channel and not the secondary synchronization channel. In a second embodiment, the step of rotating the primary synchronization channel in phase comprises rotating the synchronization channel in phase. Thus, the second embodiment rotates both the primary and secondary synchronization channels after they have been combined. In yet another embodiment, the synchronization channel is combined with a dedicated channel to produce a downlink channel that is then rotated in phase.

The present invention also includes an apparatus for performing the method summarized above. The apparatus includes a primary synchronization channel generator for generating a primary synchronization channel having the primary synchronization code; a phase rotator, coupled to the primary synchronization channel generator, for rotating the primary synchronization channel in phase according to a phase rotation sequence; and a transmitter, coupled to the phase rotator, for transmitting the primary synchronization channel.

In a first embodiment, the apparatus further comprises a first combiner for combining the primary synchronization channel and the secondary synchronization channel to produce a synchronization channel; wherein the phase rotator is coupled between an output of the primary synchronization channel generator and an input of the first combiner. In a second embodiment, the phase rotator is coupled to an output of the first combiner. In a third embodiment, a second combiner combines the synchronization channel and a dedicated channel to produce a downlink channel, and the phase rotator is coupled to an output of the second combiner.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention will now be described in detail with reference to the exemplary W-CDMA system illustrated by FIGS. 1 and 2. It will be understood by one of ordinary skill in the art that the present invention is equally applicable to other communication systems in which fading is caused by destructive interference arising from the same synchronization or pilot channel being transmitted by more than one base stations in the same geographic region.

Figure 3:
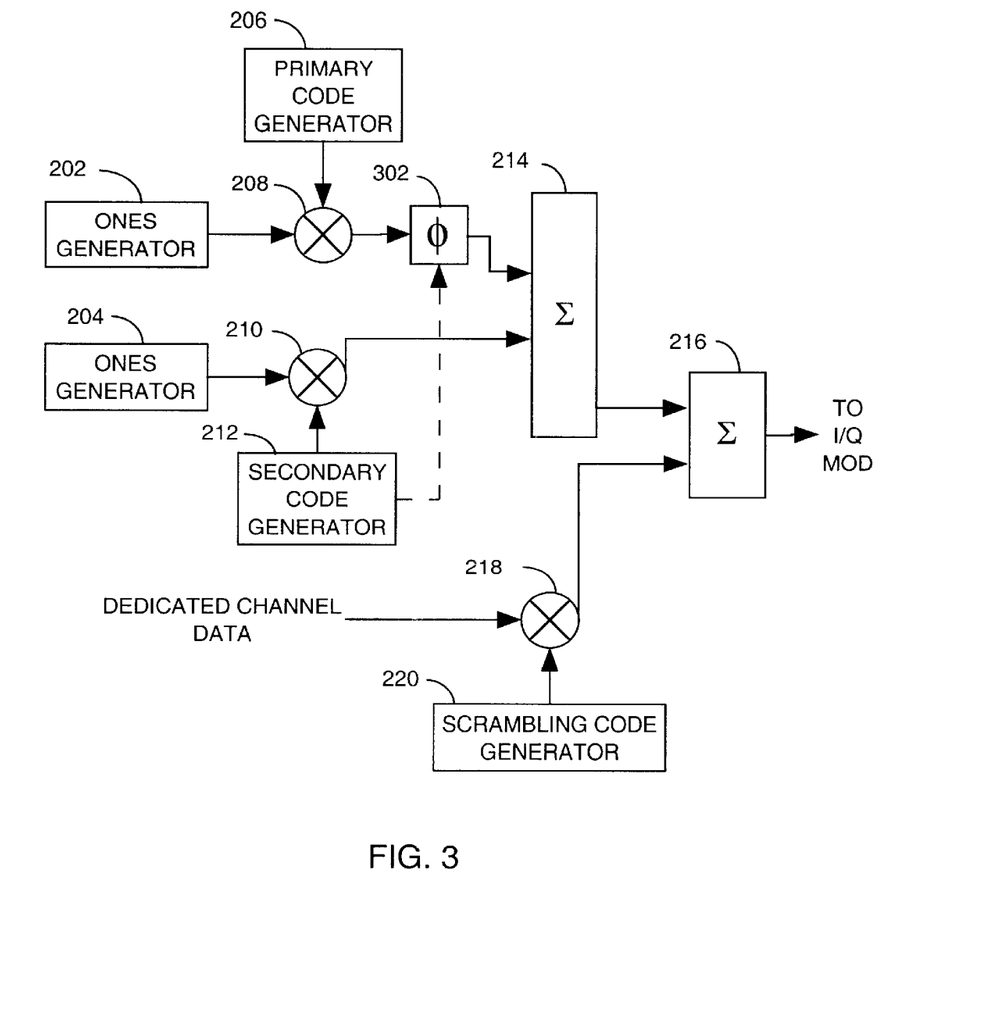
FIG. 3 is a functional block diagram of a first embodiment of the present invention.

Turning now to FIG. 3, a functional block diagram of a first embodiment of the present invention is illustrated. FIG. 3 is similar to FIG. 2, with the addition of phase rotator 302 between complex spreader 208 and combiner 214. Phase rotator 302 introduces a phase rotation of the primary SCH, after spreading with the primary synchronization code, $c_p$, and before combination with the secondary SCH. As previously noted, the signals illustrated in FIG. 3 as traveling between functional blocks are, in general, complex I and Q signals. Preferably, the phase shift introduced by phase rotator 302 is pseudorandomly chosen for each slot from among a set of predefined phase shifts. For example, a suggested set of predefined phase shifts would include zero, $\pi/2$, $\pi$, and $3\pi/2$ radians. Other predefined sets may be used in various embodiments. The present invention is not limited by the amount of the phase shift(s) chosen.

In one embodiment, phase rotator 302 generates the pseudorandom phase shift sequence, as well as introducing that phase shift into the primary SCH. In an alternate embodiment, the pseudorandom phase shift sequence may be provided to phase rotator 302 by a separate functional element. For example, one convenient source of a pseudorandom number for controlling the phase shift introduced by phase rotator 302 is the secondary synchronization code, $c_s$, generated by secondary code generator 212.

Since the secondary synchronization code is not common to all base stations, but only to those of the same code group, it may be advantageously used to ensure that two base stations of different code groups having a phase collision of the primary SCH will not introduce the same pseudorandom sequence of phase shifts into their primary SCH, thereby prolonging the duration of the mutual interference. For example, since the secondary SCH is a binary data stream of logical ones and zeros, if the first chip were a "one" it could cause phase rotator 302 to introduce a phase shift of $\pi$ radians into the primary SCH, whereas a "zero" could cause phase rotator 302 to introduce no phase shift into the primary SCH. Alternately, the secondary SCH could be taken two chips at a time, with the '00' sequence corresponding to a zero phase shift, the '01' sequence corresponding to a phase shift of $\pi/2$ radians, the '10' sequence corresponding to a phase shift of $\pi$ radians, and the '11' sequence corresponding to a phase shift of $3\pi/2$ radians. Clearly, many different implementation schemes or pseudorandom sequences may be used, whether or not they are related to the secondary synchronization code.

Phase rotator 302 preferably changes the phase of the primary SCH only once per burst transmission, which equates to once per slot. Thus, each repetition of the primary SCH would have a pseudorandom phase shift. For example, the first slot of a frame might transmit the primary SCH with a phase shift of $\pi$ radians, whereas the second slot of the same frame might transmit the primary SCH with a phase shift of zero radians. Alternately, phase rotator 302 may change the phase of the primary SCH once per frame, rather than once per slot. Thus, each repetition of the primary SCH during a first frame would have a first pseudorandom phase shift, and each repetition of the primary SCH during a second frame would have a second pseudorandom phase shift, where the first and second pseudorandom phase shifts are not necessarily equal. Clearly, many different timing schemes for pseudorandomly changing the phase of the primary SCH may be used, whether or not they are based on a slot or frame periodicity.

Thus, the phase rotator 302 of FIG. 3 introduces a pseudorandom phase shift in the primary SCH, after spreading by the primary synchronization code, and before combination with the secondary SCH. This pseudorandom phase shift mitigates the problem of phase collisions between multiple base stations, operating asynchronously, which all share the same primary synchronization code.

Figure 4:
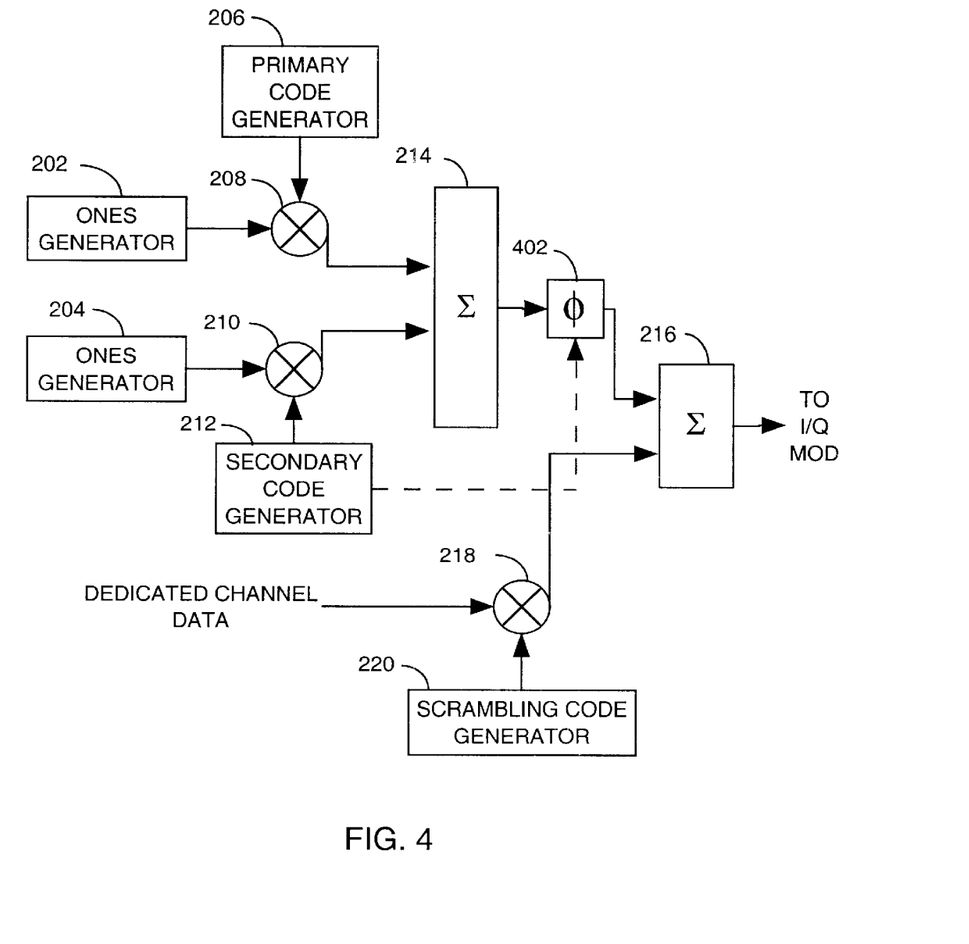
FIG. 4 is a functional block diagram of a second embodiment of the present invention.

Turning now to FIG. 4, a functional block diagram of a second embodiment of the present invention is illustrated. FIG. 4 differs from FIG. 3 in that the phase rotation introduced by phase rotator 402 of FIG. 4 occurs after the combination of the primary SCH and the secondary SCH by combiner 214, rather than before their combination. In all other respects rotator 402 may be similar in construction and functionality to phase rotator 302 of FIG. 3. By introducing the phase rotation by phase rotator 402 after the combination of the primary and secondary SCH, the entire synchronization channel is then rotated in phase.

In the embodiments of both FIG. 3 and FIG. 4, the amount of phase rotation and the timing of the phase rotation performed by either phase rotator 302 or phase rotator 402 may be unknown, a priori, to the mobile station. However, the mobile station will still be able to acquire and demodulate the primary and secondary SCH by using conventional receivers that are well known in the art. To the mobile station, the phase variations introduced by phase rotators 302 or 402 appear merely as variations in the propagation environment. Thus, the use of virtually any phase rotation sequence by phase rotator 302 or phase rotator 402 will suffice for these embodiments.

Figure 5:
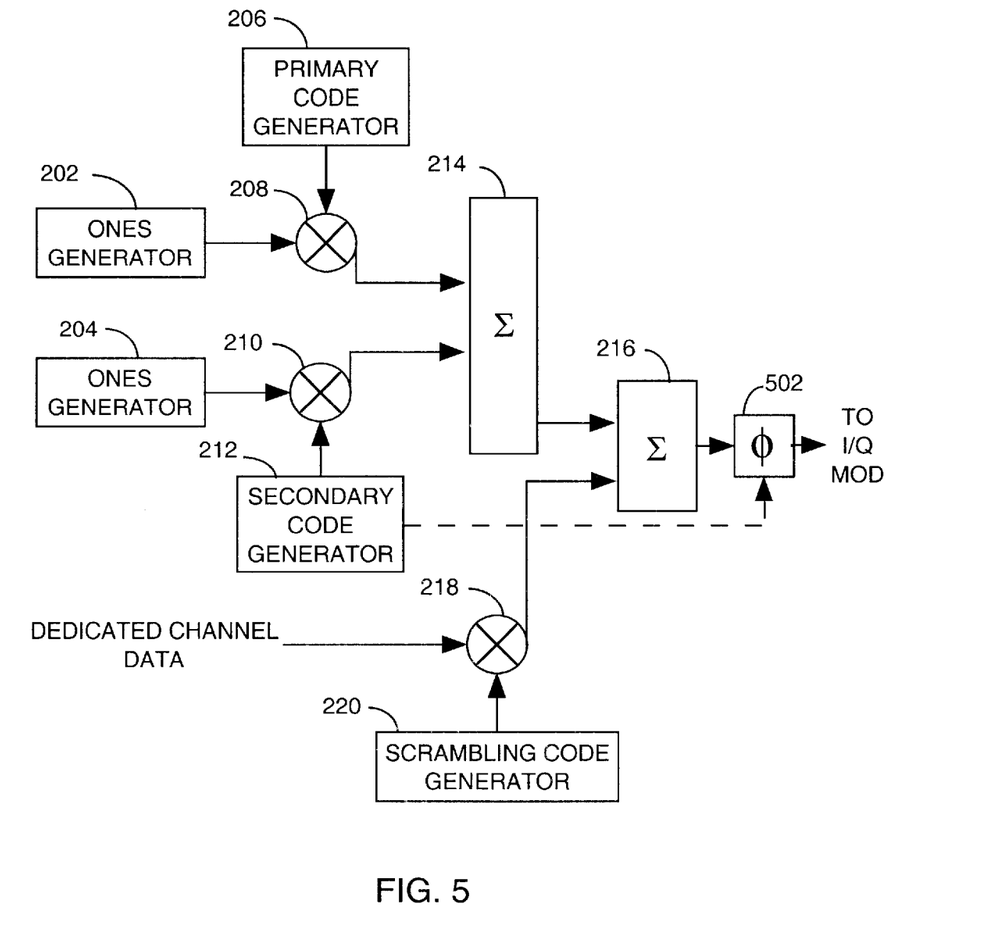
FIG. 5 is a functional block diagram of a third embodiment of the present invention.

Turning now to the embodiment of FIG. 5, a functional block diagram of a third embodiment of the present invention is illustrated in which the phase rotator 502 introduces phase variations into the combined downlink (base station to mobile station) channel. In all other respects, phase rotator 502 is similar in operation and functionality to phase rotator 302 and phase rotator 402. In FIG. 5, the synchronization channel and the dedicated data channel are combined in combiner 216 prior to the introduction of phase rotation by phase rotator 502. Thus, the pilot symbols that are transmitted at the beginning of every slot of the dedicated data channel will be rotated in phase from slot to slot or frame to frame. A typical coherent demodulator (not shown) in the mobile station will generally accumulate pilot phase and energy over several consecutive slots in order to generate a stable channel estimate for coherently demodulating the data. Clearly, abrupt and pseudorandom phase variations in the pilot symbols introduced by phase rotator 502 will lead to difficulty in pilot phase accumulation by the mobile station unless the mobile station knows, a priori, the pseudorandom phase rotation sequence or pattern. This would, in turn, lead to less reliable data demodulation and errors.

However, in the embodiment of FIG. 5, the pseudorandom phase shift sequence introduced by phase rotator 502 may be based, as described above with reference to FIG. 3, on the secondary synchronization code, $c_s$, contained in secondary code generator 212. The secondary synchronization code, $c_s$, is provided in the W-CDMA standard and is used by the mobile station in the second stage of the acquisition process. It is well known to the mobile station once it has demodulated the secondary SCH, and before it begins to demodulate the dedicated channels. Thus, by introducing a pseudorandom phase shift that is based on the secondary synchronization code into the downlink channel, the embodiment of FIG. 5 may be advantageously used to avoid the difficulties associated with pilot phase accumulation by the mobile station. All that is necessary is that the mobile station apply a phase rotation the received signal that is opposite of the one introduced by phase rotator 502 according to the secondary synchronization code before accumulation of the pilot phase. Again, any method suggested above of encoding phase variations from the secondary synchronization code may be used (i.e., '0' is zero rotation, '1' is a rotation of $\pi$), and any timing method suggested above may be used (i.e., once per slot, once per frame, etc.).

It also should be noted that other sources of the pseudorandom phase shift may be used. For example, the base station may provide the particular pseudorandom phase shift sequence that the base station is currently using in an overhead signaling message to the mobile station. Alternately, the pseudorandom phase shift sequence may be explicitly specified in the standard. In yet another embodiment, the pseudorandom phase shift may be derived from any unique or semi-unique identifier of the base station. Clearly, there are several different and complementary techniques for providing the pseudorandom phase shift sequence to the mobile station. The present invention is not limited by the particular technique chosen.

Figure 6:
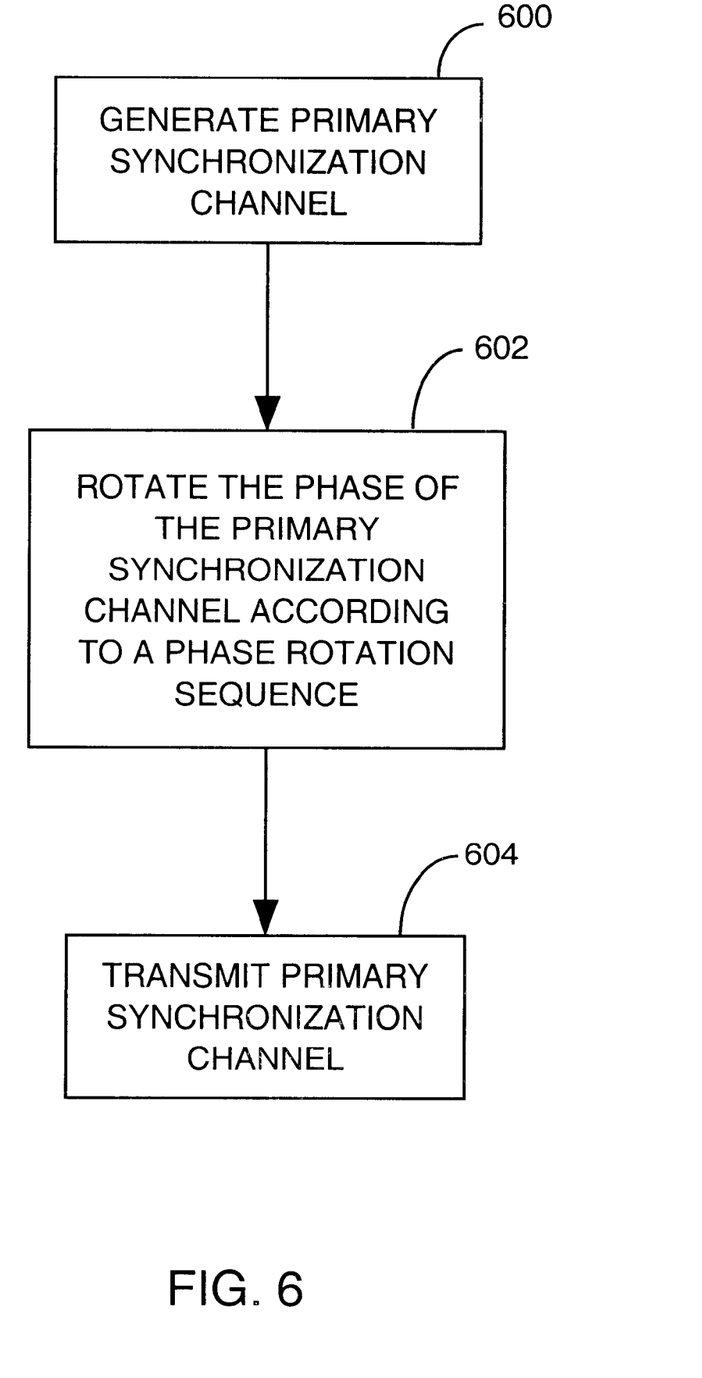
FIG. 6 is a flow diagram of the method of the present invention.

FIG. 6 illustrates a flow diagram of the method of the present invention. The method described in FIG. 6 generically may be performed by any of the embodiments of FIGS. 3, 4, or 5. At step 600, the primary synchronization channel is generated. This may be performed, for example, by spreading the output of ones generator 202 with the primary synchronization code signal generated by primary code generator 206 in complex spreader 208. At step 602, the phase of the primary synchronization channel is rotated according to a phase rotation sequence. This step may be performed, for example, by any of phase rotator 302, phase rotator 402, or phase rotator 502. It should be noted that in the embodiment of FIG. 3, the phase rotator 302 acts on the primary SCH alone, whereas in the embodiments of FIGS. 4 and 5, the phase rotators 402 and 502 respectively operate on a combination signal which inherently includes the primary SCH. The phase rotation sequence may be any recurring sequence sufficient to prevent prolonged fading due to destructive interference. For example, the phase rotation sequence may be pseudorandomly shifting between zero and $\pi$ radians every slot. Other example phase rotation sequences are given above. At step 604, the primary synchronization channel is transmitted. This step may be performed by any conventional transmitter (not shown) within a base station that uses the present invention.

By performing the method of the present invention as shown in FIG. 6, a base station in a W-CDMA system will be able to avoid prolonged "fading" of the downlink signal caused by timing collisions on the primary SCH. By changing the phase of the primary SCH, the destructive interference that would otherwise occur in some regions in the mutual geographic coverage area of two base stations will be mitigated. In turn, the method of the present invention, as implemented by the various embodiments described herein, will enable a mobile station to more rapidly acquire the downlink of the base station in such mutual interference situations.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for mitigating the effect of interference between a first base station and a second base station, said first base station and second base stations both sharing a same primary synchronization code, the method comprising the steps of:
   generating a primary synchronization channel having said primary synchronization code;
   rotating said primary synchronization channel in phase according to a phase rotation sequence; and
   transmitting said primary synchronization channel.

2. The method of claim 1 wherein said phase rotation sequence is pseudorandom.

3. The method of claim 2 wherein said phase rotation sequence includes changing phase once per slot.

4. The method of claim 2 wherein said phase rotation sequence includes changing phase once per frame.

5. The method of claim 3 wherein said phase rotation sequence includes changing phase by integer multiples of $\pi/2$ radians.

6. The method of claim 4 wherein said phase rotation sequence includes changing phase by integer multiples of $\pi/2$ radians.

7. The method of claim 2 further comprising the step of generating a secondary synchronization channel having a secondary synchronization code, said phase rotation sequence being based at least in part on said secondary synchronization code.

8. The method of claim 7 further comprising the step of:
   combining said primary synchronization channel and said secondary synchronization channel to produce a synchronization channel;
   wherein said step of rotating said primary synchronization channel in phase comprises rotating said primary synchronization channel before said combining step.

9. The method of claim 7 further comprising the step of:
   combining said primary synchronization channel and said secondary synchronization channel to produce a synchronization channel;
   wherein said step of rotating said primary synchronization channel in phase comprises rotating said synchronization channel in phase.

10. The method of claim 7 further comprising the steps of:

generating a dedicated channel;

combining said primary synchronization channel and said secondary synchronization channel to produce a synchronization channel; and combining said synchronization channel and said dedicated channel to produce a downlink channel;

wherein said step of rotating said primary synchronization channel in phase comprises rotating said downlink channel in phase.

11. An apparatus for mitigating the effect of interference between a first base station and a second base station, said first base station and second base stations both sharing a same primary synchronization code, the apparatus comprising:

a primary synchronization channel generator for generating a primary synchronization channel having said primary synchronization code;

a phase rotator, coupled to said primary synchronization channel generator, for rotating said primary synchronization channel in phase according to a phase rotation sequence; and a transmitter, coupled to said phase rotator, for transmitting said primary synchronization channel.

12. The apparatus of claim 11 wherein said phase rotation sequence is pseudorandom.

13. The apparatus of claim 12 wherein said phase rotation sequence includes changing phase once per slot.

14. The apparatus of claim 12 wherein said phase rotation sequence includes changing phase once per frame.

15. The apparatus of claim 13 wherein said phase rotation sequence includes changing phase by integer multiples of $\pi/2$ radians.

16. The apparatus of claim 14 wherein said phase rotation sequence includes changing phase by integer multiples of $\pi/2$ radians.

17. The apparatus of claim 12 further comprising a secondary synchronization channel generator for generating a secondary synchronization channel having a secondary synchronization code, said phase rotation sequence being based at least in part on said secondary synchronization code.

18. The apparatus of claim 17 further comprising:

a first combiner for combining said primary synchronization channel and said secondary synchronization channel to produce a synchronization channel;

wherein said phase rotator is coupled between an output of said primary synchronization channel generator and an input of said first combiner.

19. The apparatus of claim 17 further comprising:

a first combiner for combining said primary synchronization channel and said secondary synchronization channel to produce a synchronization channel;

wherein said phase rotator is coupled to an output of said first combiner.

20. The apparatus of claim 17 further comprising:

a first combiner for combining said primary synchronization channel and said secondary synchronization channel to produce a synchronization channel; and a second combiner for combining said synchronization channel and a dedicated channel to produce a downlink channel;

wherein said phase rotator is coupled to an output of said second combiner.

\* \* \* \* \*